(12) United States Patent
Liao et al.

(10) Patent No.: US 9,477,067 B2
(45) Date of Patent: Oct. 25, 2016

(54) FIVE-PIECE LENS SET FOR CAPTURING IMAGES

(71) Applicant: ABILITY OPTO-ELECTRONICS TECHNOLOGY CO.LTD., Taichung (TW)

(72) Inventors: Kuo-Yu Liao, Taichung (TW); Chen-Hung Tsai, Taichung (TW)

(73) Assignee: ABILITY OPTO-ELECTRONICS TECHNOLOGY CO.LTD., Taichung (TW)

( * ) Notice: Subject to any disclaimer, the term of this patent is extended or adjusted under 35 U.S.C. 154(b) by 0 days.

(21) Appl. No.: 14/742,091

(22) Filed: Jun. 17, 2015

(65) Prior Publication Data
US 2016/0147043 A1 May 26, 2016

(30) Foreign Application Priority Data

Nov. 26, 2014 (TW) .............................. 103141047 A

(51) Int. Cl.
G02B 13/18 (2006.01)
G02B 3/02 (2006.01)
G02B 9/60 (2006.01)
G02B 13/00 (2006.01)
G02B 27/00 (2006.01)
G02B 5/00 (2006.01)
G02B 1/04 (2006.01)

(52) U.S. Cl.
CPC ........... G02B 13/0045 (2013.01); G02B 5/005 (2013.01); G02B 27/0025 (2013.01); G02B 1/041 (2013.01); G02B 9/60 (2013.01); G02B 13/0015 (2013.01); G02B 13/18 (2013.01)

(58) Field of Classification Search
CPC .... G02B 13/0045; G02B 9/60; G02B 13/18; G02B 5/005; G02B 1/041; G02B 13/0015
USPC ................................ 359/714, 739, 753, 770
See application file for complete search history.

(56) References Cited

U.S. PATENT DOCUMENTS 8,289,628 B2 * 10/2012 Asami ................... G02B 13/06
359/714

FOREIGN PATENT DOCUMENTS

| CN | 103926674 A | 7/2014 |
| JP | 2009223251 A | 10/2009 |
| TW | 201200900 A1 | 1/2012 |
| TW | 201232021 A1 | 8/2012 |
| TW | 201432300 A | 8/2014 |

* cited by examiner

Primary Examiner — Evelyn A Lester
(74) Attorney, Agent, or Firm — Muncy, Geissler, Olds & Lowe, P.C.

(57) ABSTRACT

A five-piece lens set for capturing images, which includes a fixed aperture stop and an optical lens set, is disclosed. The optical lens set includes a first, a second, a third, a fourth and a fifth lens elements. The first lens element has negative refractive power adjacent to optical axis and a concave image side surface. The second lens element has negative refractive power adjacent to optical axis. The third lens element has positive refractive power adjacent to optical axis, both convex image side and object side surface. The fourth lens element has positive refractive power adjacent to optical axis and a convex object side surface. The fifth lens element has negative refractive power adjacent to optical axis and a convex image side surface. There is an interval between the image side surface of the fourth lens element and the object side surface of the fifth lens element.

15 Claims, 10 Drawing Sheets

FIVE-PIECE LENS SET FOR CAPTURING IMAGES

CROSS-REFERENCE TO RELATED APPLICATION

This application claims priority from Taiwan Patent Application No. 103141047, filed on Nov. 26, 2014, in the Taiwan Intellectual Property Office, the content of which are hereby incorporated by reference in their entirety for all purposes.

BACKGROUND OF THE INVENTION

1. Field of the Invention

The following description relates to a lens set for capturing images, in particular to a five-piece lens set for capturing images with ultra-wide field of view applicable to electronic products.

2. Description of the Related Art

In the recent years, as the electronic products with image capturing function have been developed, the demand for miniaturization of photographic lenses is gradually increasing. The photosensitive elements of the general photographic lenses are either Charge Coupled Device (CCD) or Complementary Metal Oxide Semiconductor sensor (CMOS sensor). As the processing technology of semiconductor has been advancing, the pixel sizes of the photosensitive elements have been reduced. The miniaturization of the photographic lenses is gradually proceeding to the field of high pixel resolution. Therefore, the demand for high quality of image sensing is also gradually increasing.

In the designs of various miniaturized five-piece optical lens set with fixed focal lengths, the conventional techniques can increase the back focal length and the full length of the optical image capturing by different combination of lens elements with positive or negative refractive power, for example, making use of the configuration of the fourth lens element with negative refractive power and the fifth lens element with negative refractive power, but the full length of the optical system will be easily resulted in being more difficult to be shortened.

Thus, how to effectively shorten the total length of the optical lens set and effectively combine a plurality of lens sets to further enhance the quality of image capturing, has become a very important issue.

SUMMARY OF THE INVENTION

The aspect of the embodiment of the present invention directs to a five-piece lens set for capturing images which makes use of the combinations of the refractive powers, the inflection points, the convex surfaces and the concave surfaces of the five lens elements to effectively shorten the total length of the lens elements for the optical image capturing and enhance the quality of image capturing.

According to the purpose of the present invention, a five-piece lens set for capturing images is provided, which includes: a fixed aperture stop and an optical lens set. The optical lens set sequentially from an object side surface to an image side surface along an optical axis includes a first lens element, a second lens element, a third lens element, a fourth lens element, and a fifth lens element. The first lens element has negative refractive power adjacent to the optical axis and an image side surface of the first lens element is a concave surface. The second lens element has negative refractive power adjacent to the optical axis. The third lens element has positive refractive power adjacent to the optical axis. An object side surface of the third lens element is a convex surface and an image side surface of the third lens element is a convex surface. The fourth lens element has positive refractive power adjacent to the optical axis and an object side surface of the fourth lens element is a convex surface. The fifth lens element has negative refractive power adjacent to the optical axis and an image side surface of the fifth lens element is a convex surface, wherein the image side surface of the fifth lens element is an aspherical surface. Wherein there is a length of air interval between an image side surface of the fourth lens element and an object side surface of the fifth lens element.

Preferably, the length of air interval of maximum horizontal displacement of optical effective diameter position from the image side surface of the fourth lens element to the object side surface of the fifth lens element is T45, and the following relation is satisfied: $T45 > 0.01$ mm.

Preferably, a distance of horizontal displacement perpendicularly projected on the optical axis from an axial point on the optical axis of the image side surface of the fourth lens element to a maximum effective diameter of the image side surface of the fourth lens element is Sag4, a distance of horizontal displacement perpendicularly projected on the optical axis from an axial point on the optical axis of the object side surface of the fifth lens element to a maximum effective diameter of the object side surface of the fifth lens element is Sag5, and the following relation is satisfied: $0.8 < |Sag4|/|Sag5| < 1.4$.

Preferably, the image side surface of the fifth lens element has at least one inflection point.

Preferably, a vertical distance on the image side surface of the fifth lens element between an inflection point nearest to the optical axis and the optical axis is HI, and the following relation is satisfied: $0 \text{ mm} \leq HI \leq 1 \text{ mm}$.

Preferably, a distance of horizontal displacement perpendicularly projected on the optical axis from an axial point on the optical axis of the image side surface of the fifth lens element to a maximum effective diameter of the image side surface of the fifth lens element is DR, and the following relation is satisfied: $0 \text{ mm} \leq DR \leq 0.5 \text{ mm}$.

Preferably, the five-piece lens set for capturing images of the present invention further includes an aperture stop and an image plane, wherein a distance on the optical axis from the aperture stop to the image plane is AT and a distance on the optical axis from the object side surface of the first lens element to the image plane is OT, and the following relation is satisfied: $0.5 \leq AT/OT \leq 0.8$.

Preferably, a maximum field of view in use of the five-piece lens set for capturing images is FOV, and the following relation is satisfied: $FOV > 90°$.

Preferably, an Abbe number of the first lens element in spectrum 587.6 nm is Vd1, an Abbe number of the second lens element in spectrum 587.6 nm is Vd2, an Abbe number of the third lens element in spectrum 587.6 nm is Vd3, an Abbe number of the fourth lens element in spectrum 587.6 nm is Vd4, an Abbe number of the fifth lens element in spectrum 587.6 nm is Vd5, and the following relation is satisfied: $Vd1 + Vd2 + Vd3 + Vd4 > 6Vd5$.

Preferably, a sum of thicknesses of all lens elements with refractive power on the optical axis is $\Sigma CT$ and a distance on the optical axis from the object side surface of the first lens element to the image side surface of the fifth lens element is TT, and the following relation is satisfied: $0.5 \leq \Sigma CT/TT \leq 0.85$.

Preferably, a focal length of the optical lens set is f and a distance on the optical axis from the image side surface of the first lens element to the object side surface of the second lens element is T12, and the following relation is satisfied: $0.3 \leq T12/f \leq 0.7$.

Preferably, the five-piece lens set for capturing images of the present invention further includes an image plane, wherein a distance on the optical axis from the object side surface of the first lens element to the image side surface of the fifth lens element is TT and a distance on the optical axis from the object side surface of the first lens element to the image plane is OT, and the following relation is satisfied: $0.5 \leq TT/OT \leq 0.7$.

Preferably, a distance on the optical axis from the image side surface of the first lens element to the object side surface of the second lens element is T12, the thicknesses of the first lens element and the second lens element are CT1 and CT2 respectively, and the following relation is satisfied: $2.0 \leq (CT2+T12)/CT1 \leq 6.0$.

Preferably, a maximum field of view in use of the five-piece lens set for capturing images is FOV, and the following relation is satisfied: $90° < FOV < 180°$.

Preferably, a thickness of the fifth lens element on the optical axis is CT5, and the following relation is satisfied: $0 < DR/CT5 < 0.3$.

Preferably, a distance of horizontal displacement perpendicularly projected on the optical axis from an axial point on the optical axis of the image side surface of the fifth lens element to a maximum effective diameter of the image side surface of the fifth lens element is DR, and the following relation is satisfied: $0 \text{ mm} \leq DR \leq 0.5 \text{ mm}$, $0 \leq DR/HI \leq 0.3$.

Preferably, the five pieces of the imaging lens group, wherein the object side surface of the second lens element near the optical axis is a concave surface.

BRIEF DESCRIPTION OF THE DRAWINGS

The aforementioned and other features and advantages of the present invention will become more apparent by illustrating the exemplary embodiments thereof in detail with reference to the accompanying drawings, wherein.

DETAILED DESCRIPTION OF THE PREFERRED EMBODIMENTS

In order to facilitate the understanding of the features, the contents and the advantages of the present invention, and the effectiveness thereof that can be achieved, the present invention will be illustrated in detail below through embodiments with reference to the accompanying drawings. On the other hand, the diagrams used herein are merely intended to be schematic and auxiliary to the specification, but are not necessary to be true scale and precise configuration after implementing the present invention. Thus, it should not be interpreted in accordance with the scale and the configuration of the accompanying drawings to limit the scope of the present invention on the practical implementation.

The advantages, the features and the technical method achieved of the present invention will be described in more detail with reference to the exemplary embodiments and the accompanying drawings and will be understood more easily. The present invention may be realized in different forms, and thus should not be construed to be only limited by the embodiments set forth herein. On the contrary, the embodiments provided will make the present disclosure more thorough and complete and fully convey the scope of the present invention to the ordinary skills in the relevant technical field. The present invention will only be defined by the appended claims.

Figure 1:
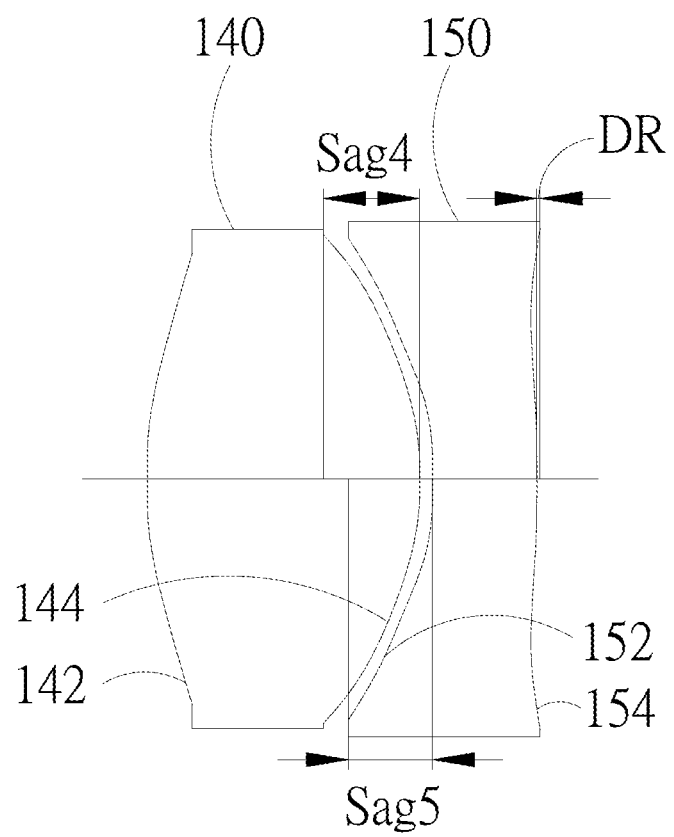
FIG. 1 is a schematic view of the relevant parameters according to the present invention.

Please refer to FIG. 1, which is a schematic view of the relevant parameters according to the present invention. In order to describe the parameters Sag4, Sag5 and DR clearly, respectively, FIG. 1 shows a schematic view of Sag4 on the fourth lens 140 as well as Sag5 and DR on the fifth lens 150. Wherein, a distance of horizontal displacement perpendicularly projected on the optical axis from an axial point on the optical axis of the image side surface 144 of the fourth lens element 140 to a maximum effective diameter of the image side surface 144 of the fourth lens element 140 is Sag4. A distance of horizontal displacement perpendicularly projected on the optical axis from an axial point on the optical axis of the object side surface 152 of the fifth lens element 150 to a maximum effective diameter of the object side surface 152 of the fifth lens element 150 is Sag5. A distance of horizontal displacement perpendicularly projected on the optical axis from an axial point on the optical axis of the image side surface 154 of the fifth lens element 150 to a maximum effective diameter of the image side surface 154 of the fifth lens element 150 is DR.

Figure 2A:
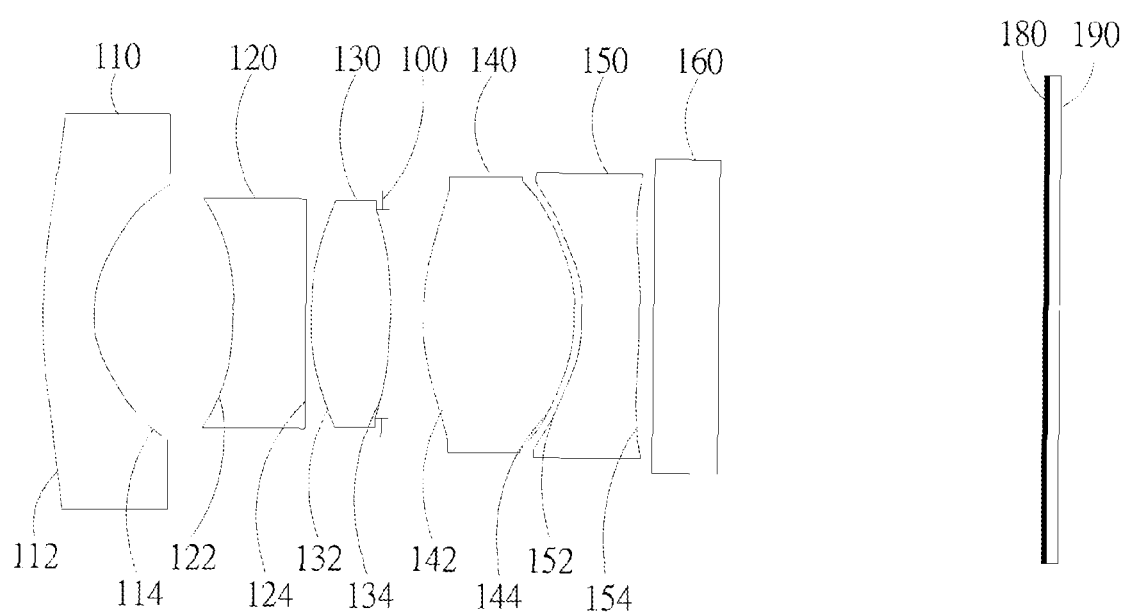
FIG. 2A is a schematic view of the five-piece lens set for capturing images according to the first embodiment of the present invention.

Please refer to FIG. 2A, which shows a schematic view of the five-piece lens set for capturing images of the first embodiment of the present invention. As shown in FIG. 2A, the present invention includes an optical image capturing lens sequentially from an object side surface to an image side surface along an optical axis including a first lens element 110, a second lens element 120, a third lens element 130, a fourth lens element 140, and a fifth lens element 150.

The first lens element 110 has negative refractive power adjacent to the optical axis and an image side surface 114 of the first lens element is a concave surface. The second lens element 120 has negative refractive power adjacent to the optical axis. The third lens element 130 has positive refractive power adjacent to the optical axis. An object side surface 132 of the third lens element 130 is a convex surface and an image side surface 134 of the third lens element 130 is a convex surface. The fourth lens element 140 has positive refractive power adjacent to the optical axis and an object side surface 142 of the fourth lens element 140 is a convex surface. The fifth lens element 150 has negative refractive power adjacent to the optical axis and an image side surface 154 of the fifth lens element 150 is a convex surface, wherein the image side surface 154 of the fifth lens element 150 is an aspherical surface and the image side surface 154 of the fifth lens element 150 has an inflection point. There is a length of air interval between an image side surface 144 of the fourth lens element 140 and an object side surface 152 of the fifth lens element 150.

The present invention makes use of an aspherical optical surface to manufacture shapes other than spherical in order to obtain more control variables and reduce aberrations. Thereby, better resolution and compactness between the lenses are provided, and the total length of the lenses is effectively decreased.

The five-piece lens set for capturing images of the present invention further includes a a fixed aperture stop 100 and an infrared filter 160. The fixed aperture stop 100 is disposed between the third lens element 130 and the fourth lens element 140. The infrared filter 160 is disposed between the fifth lens element 150 and the image plane 180. The infrared filter 160 is usually made of flat plate optical materials, which do not affect the focal length of the optical lens set of the present invention.

The five-piece lens set for capturing images of the present invention may also include an electronic photosensitive element 190, which is disposed on the image plane 180 and may capture the image of the photograpghed object. The first lens element 110 to the fifth lens element 150 may include a plastic material or a glass material. The equation of the aspherical surface of the present invention is:

[Formula 1]

$$z = ch^2/[1+[1-(k+1)c^2h^2]^{0.5}] + Ah^4 + Bh^6 + Ch^8 + Dh^{10} + Eh^{12} + Fh^{14} + Gh^{16} + Hh^{18} + Jh^{20} + \ldots \quad (1)$$

Wherein, z is a value of position with reference to the vertex of the surface at the height h along the direction of the optical axis, k is a cone metric constant, c is a reciprocal of the radius of curvature, and A, B, C, D, E, F, G, H and J are higher-order aspherical coefficients.

The optical data of the first embodiment are shown in Table 1, wherein the object side surface and the image side surface of the first lens element 110 to the fifth lens element 150 are constituted by using the equation of the aspherical surface of the formula (1) respectively. The aspherical coefficients thereof are shown in Table 2 and the reference wavelength thereof is d-line 587 nm. Wherein, the length of air interval of maximum horizontal displacement of optical effective diameter position from the image side surface 144 of the fourth lens element 140 to the object side surface 152 of the fifth lens element 150 T45 is 0.022 mm. The distance of horizontal displacement perpendicularly projected on the optical axis from an axial point on the optical axis of the image side surface 144 of the fourth lens element 140 to a maximum effective diameter of the image side surface 144 of the fourth lens element 140 Sag4=−0.172 mm. The distance of horizontal displacement perpendicularly projected on the optical axis from an axial point on the optical axis of the object side surface 152 of the fifth lens element 150 to a maximum effective diameter of the object side surface 152 of the fifth lens element 150 Sag5=−0.149 mm. Wherein |Sag4|/|Sag5|=1.15 satisfies 0.8<|Sag4|/|Sag5|<1.4.

The vertical distance on the image side surface 154 of the fifth lens element 150 between an inflection point and the optical axis HI=0.161 mm. The distance of horizontal displacement perpendicularly projected on the optical axis from an axial point on the optical axis of the image side surface 154 of the fifth lens element 150 to a maximum effective diameter of the image side surface 154 of the fifth lens element 150 DR is 0.004 mm. Also, 0 mm≤HI≤1 mm and 0 mm≤DR≤0.5 mm are satisfied. The distance from the fixed aperture stop 100 to the image plane 180 AT is 2.120 mm. The distance from the object side surface 112 of the first lens element 110 to the image plane 180 OT is 3.201 mm. AT/OT=0.662 satisfies 0.5≤AT/OT≤0.8. The maximum field of view in use of the five-piece lens set for capturing images FOV is 104° and 90°<FOV<180° is satisfied. An Abbe number of the first lens element 110 in spectrum 587.6 nm Vd1 is 56.07. An Abbe number of the second lens element 120 in spectrum 587.6 nm Vd2 is 56.07. An Abbe number of the third lens element 130 in spectrum 587.6 nm Vd3 is 56.07. An Abbe number of the fourth lens element 140 in spectrum 587.6 nm Vd4 is 56.07. An Abbe number of the fifth lens element 150 in spectrum 587.6 nm Vd5 is 23.416. Also, Vd1+Vd2+Vd3+Vd4>6Vd5 is satisfied.

The sum of thicknesses of all lens elements with refractive power on the optical axis ΣCT is 1.316 mm. The distance on the optical axis from the object side surface 112 of the first lens element 110 to the image side surface 154 of the fifth lens element 150 TT is 1.910 mm, wherein ΣCT/TT=0.689 satisfies 0.5≤TT/OT≤0.7. The focal length of the optical lens set f=0.885 mm. The distance on the optical axis from the image side surface 114 of the first lens element 110 to the object side surface 122 of the second lens element 120 T12 is 0.442 mm, wherein T12/f=0.500 and TT/OT=0.597, 0.3≤T12/f≤0.7 and 0.5≤TT/OT≤0.7 are satisfied. Also, (CT2+T12)/CT1=4.07, DR/CT5=0.021 and DR/HI=0.024, 2.0 (CT2+T12)/CT1≤6.0, 0<DR/CT5<0.3 and 0≤DR/HI≤0.3 are satisfied respectively.

TABLE 1 the basic data of the lens elements of the first embodiment.

| Surface | | Radius of curvature | Thickness/ Interval | Refractive index (Nd) | Abbe number (Vd) | Focal length (EFL) |
|---|---|---|---|---|---|---|
| The first lens element | The first surface | 1.543 | 0.165 | 1.5346 | 56.07 | −1.06 |
| | The second surface | 0.400 | 0.442 | | | |
| The second lens element | The third surface | −0.904 | 0.23 | 1.5346 | 56.07 | −1.529 |
| | The forth surface | 9.626 | 0.021 | | | |
| The third lens element | The fifth surface | 0.958 | 0.251 | 1.5346 | 56.07 | 1.017 |
| | The sixth surface | −1.152 | −0.029 | | | |
| Fixed aperture stop | | ∞ | 0.137 | | | |
| The fourth lens element | The seventh surface | 0.883 | 0.483 | 1.5346 | 56.07 | 0.704 |
| | The eighth surface | −0.533 | 0.022 | | | |
| The fifth lens element | The ninth surface | −0.484 | 0.186 | 1.631919 | 23.4161 | −1.08 |
| | The tenth surface | −1.875 | 0.043 | | | |
| Infrared filter | The eleventh surface | ∞ | 0.21 | 1.5167 | 64.1673 | |
| | The twelfth surface | ∞ | 1.038 | | | |

TABLE 2 the aspherical coefficients of the first embodiment.

| Optical surface | The first surface | The second surface | The third surface | The fourth surface | The fifth surface |
|---|---|---|---|---|---|
| k | −11.18096 | −0.57027 | 0.059039 | 181.49480 | 3.60068 |
| A | −0.31786 | −0.31869 | −0.74961 | −1.06924 | −0.77705 |
| B | 0.28116 | 2.41372 | −0.96605 | 2.25220 | −0.55400 |
| C | 0.022886 | −23.23963 | 10.04174 | 40.73166 | 20.35120 |
| D | −0.22264 | 139.04151 | 0.92031 | −172.78414 | −134.31131 |
| E | 0.15438 | −289.13573 | −55.53285 | 394.96905 | 422.42994 |
| F | 0 | 0 | 0 | 199.31224 | 0 |
| G | 0 | 0 | 0 | −4369.9037 | 0 |
| H | 0 | 0 | 0 | 0 | 0 |
| J | 0 | 0 | 0 | 0 | 0 |

| Optical surface | The sixth surface | The seventh surface | The eighth surface | The ninth surface | The tenth surface |
|---|---|---|---|---|---|
| k | −16.69323 | 0.86837 | −0.77535 | −0.34417 | −18.24851 |
| A | −1.24604 | −0.67134 | 1.17039 | 3.18023 | 1.66792 |
| B | 6.68300 | −0.54138 | −6.76210 | −12.11196 | −4.20907 |
| C | −20.30752 | −7.44727 | 25.46961 | 43.49374 | 10.87108 |
| D | −86.53005 | −0.060274 | −43.50019 | −21.03746 | −12.20478 |
| E | 1472.895 | −58.27052 | 8.92866 | −31.03092 | −13.10959 |
| F | −1078.2018 | 0 | 0 | 0 | 4.46675 |
| G | −313.9366 | 0 | 0 | 0 | 42.39692 |
| H | 0 | 0 | 0 | 0 | 0 |
| J | 0 | 0 | 0 | 0 | 0 |

Figure 2B:
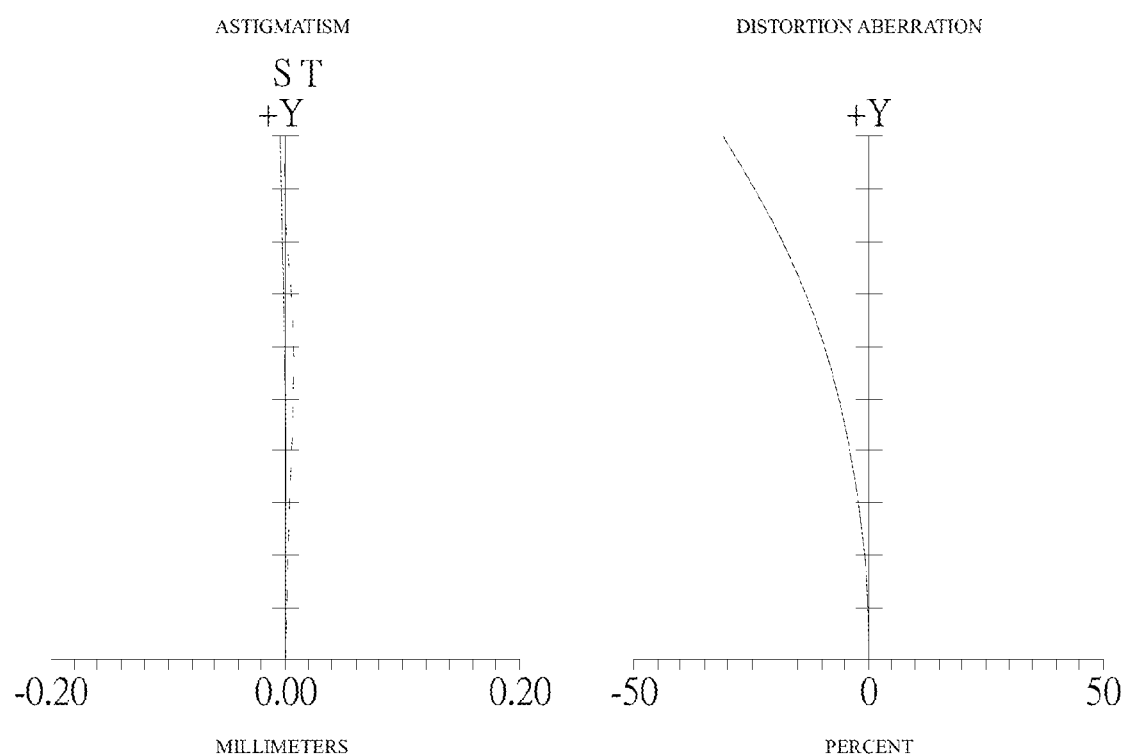
FIG. 2B is a curve of the astigmatism and the distortion aberration according to the first embodiment of the present invention.
Figure 2C:
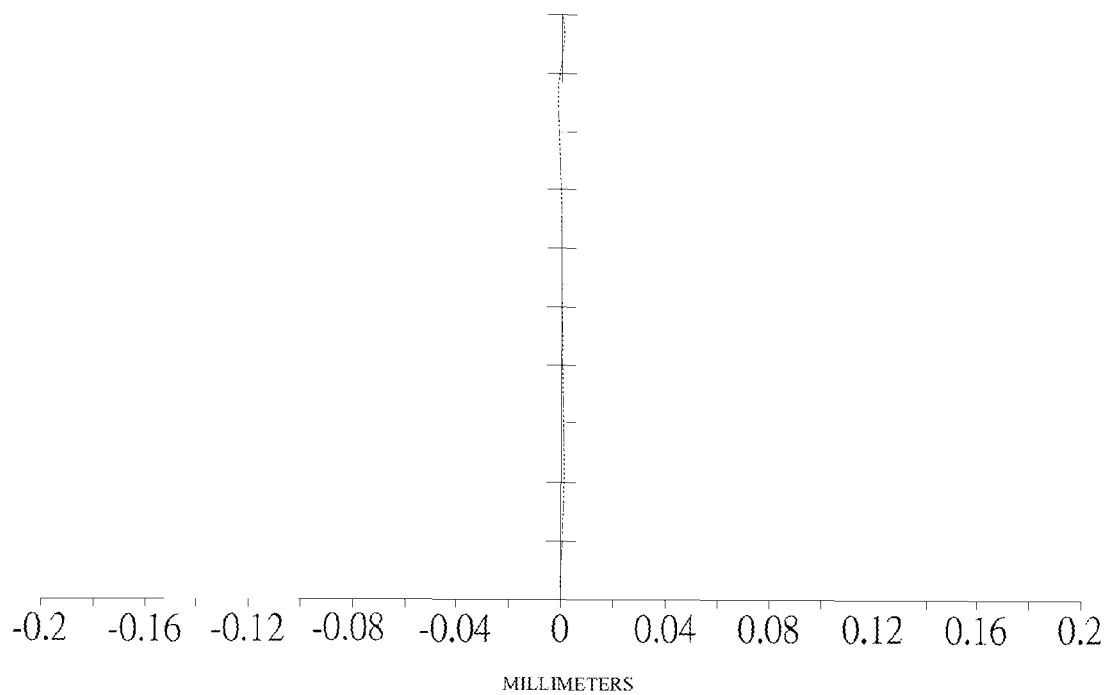
FIG. 2C is a curve of the spherical aberration according to the first embodiment of the present invention.

As known from the basic data of the lens elements of Table 1 and the aberration curves of FIGS. 2B and 2C, there is a good effect of compensation to astigmatism, distortion aberration and spherical aberration through the present embodiment of the five-piece lens set for capturing images of the present invention.

Figure 3A:
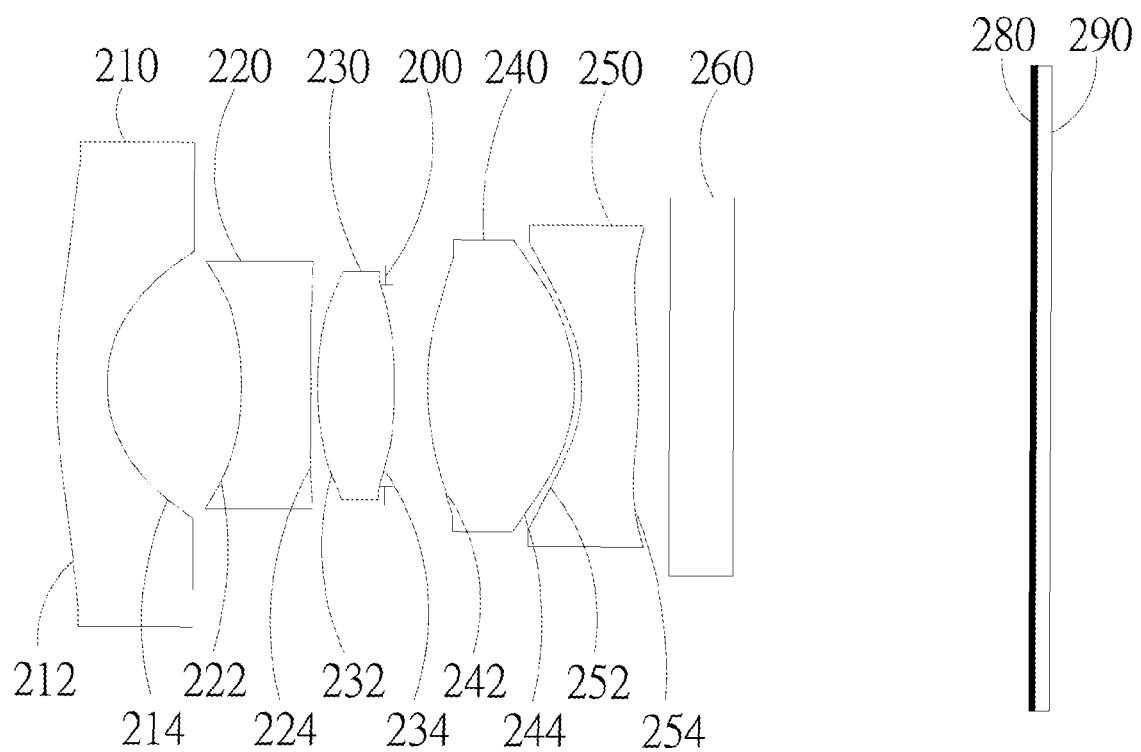
FIG. 3A is a schematic view of the five-piece lens set for capturing images according to the second embodiment of the present invention.

Please refer to FIG. 3A, which is is a schematic view of the five-piece lens set for capturing images of the second embodiment of the present invention. As shown in FIG. 3A, the present invention includes an optical image capturing lens sequentially from an object side surface to an image side surface along an optical axis including a first lens element 210, a second lens element 220, a third lens element 230, a fourth lens element 240, and a fifth lens element 250. Wherein the object side surface and the image side surface of the first lens element 210 to the fifth lens element 250 are constituted by using the equation of the aspherical surface of the formula (1) respectively. The aspherical coefficients thereof are shown in Table 4 and the reference wavelength thereof is d-line 587 nm.

In the second embodiment, the length of air interval of maximum horizontal displacement of optical effective diameter position from the image side surface 244 of the fourth lens element 240 to the object side surface 252 of the fifth lens element 250 T45 is 0.032 mm. The distance of horizontal displacement perpendicularly projected on the optical axis from an axial point on the optical axis of the image side surface 244 of the fourth lens element 240 to a maximum effective diameter of the image side surface 244 of the fourth lens element 240 Sag4=−0.295 mm. The distance of horizontal displacement perpendicularly projected on the optical axis from an axial point on the optical axis of the object side surface 252 of the fifth lens element 250 to a maximum effective diameter of the object side surface 252 of the fifth lens element 250 Sag5=−0.247 mm Wherein |Sag4|/|Sag5|=1.19 satisfies 0.8<|Sag4|/|Sag5|<1.4.

The vertical distance on the image side surface 254 of the fifth lens element 250 between an inflection point and the optical axis HI=0.231 mm. The distance of horizontal displacement perpendicularly projected on the optical axis from an axial point on the optical axis of the image side surface 254 of the fifth lens element 250 to a maximum effective diameter of the image side surface 254 of the fifth lens element 250 DR is 0.030 mm. Also, 0 mm≤HI≤1 mm and 0 mm≤DR≤0.5 mm are satisfied. The distance from the fixed aperture stop 200 to the image plane 280 AT is 3.028 mm. The distance from the object side surface 212 of the first lens element 210 to the image plane 280 OT is 4.573 mm. AT/OT=0.662 satisfies 0.5≤AT/OT≤0.8. The maximum field of view in use of the five-piece lens set for capturing images FOV is 107° and 90°<FOV<180° is satisfied. An Abbe number of the first lens element 210 in spectrum 587.6 nm Vd1 is 56.07. An Abbe number of the second lens element 220 in spectrum 587.6 nm Vd2 is 56.07. An Abbe number of the third lens element 230 in spectrum 587.6 nm Vd3 is 56.07. An Abbe number of the fourth lens element 240 in spectrum 587.6 nm Vd4 is 56.07. An Abbe number of the fifth lens element 250 in spectrum of 587.6 nm Vd5 is 23.416. Also, Vd1+Vd2+Vd3+Vd4>6Vd5 is satisfied.

The sum of thicknesses of all lens elements with refractive power on the optical axis ΣCT is 1.880 mm. The distance on the optical axis from the object side surface 212 of the first lens element 210 to the image side surface 254 of the fifth lens element 250 TT is 2.728 mm, wherein ΣCT/TT=0.689 satisfies 0.5≤TT/OT≤0.7. The focal length of the optical lens set f=1.264 mm. The distance on the optical axis from the image side surface 214 of the first lens element 210 to the object side surface 222 of the second lens element 220 T12 is 0.632 mm, wherein T12/f=0.500 and TT/OT=0.597, 0.3≤T12/f≤0.7 and 0.5≤TT/OT≤0.7 are satisfied. Also, (CT2+T12)/CT1=4.061, DR/CT5=0.112 and DR/HI=0.130, 2.0≤(CT2+T12)/CT1≤6.0, 0<DR/CT5<0.3 and 0≤DR/HI≤0.3 are satisfied respectively.

TABLE 3 the basic data of the lens elements of the second embodiment.

| Surface | | Radius of curvature | Thickness/ Interval | Refractive index (Nd) | Abbe number (Vd) | Focal length (EFL) |
|---|---|---|---|---|---|---|
| The first lens | The first surface | 2.204 | 0.236 | 1.5346 | 56.07 | −1.514 |

TABLE 3-continued the basic data of the lens elements of the second embodiment.

| Surface | | Radius of curvature | Thickness/ Interval | Refractive index (Nd) | Abbe number (Vd) | Focal length (EFL) |
|---|---|---|---|---|---|---|
| element | The second surface | 0.571 | 0.632 | | | |
| The second lens element | The third surface | −1.291 | 0.328 | 1.5346 | 56.07 | −2.184 |
| | The fourth surface | 13.751 | 0.030 | | | |
| The third lens element | The fifth surface | 1.369 | 0.359 | 1.5346 | 56.07 | 1.454 |
| | The sixth surface | −1.645 | −0.041 | | | |
| Fixed aperture stop | | ∞ | 0.196 | | | |
| The fourth lens element | The seventh surface | 1.262 | 0.960 | 1.5346 | 56.07 | 1.005 |
| | The eighth surface | −0.762 | 0.032 | | | |
| The fifth lens element | The ninth surface | −0.691 | 0.266 | 1.631919 | 23.4161 | −1.543 |
| | The tenth surface | −2.679 | 0.148 | | | |
| Infrared filter | The eleventh surface | ∞ | 0.3 | 1.5168 | 64.1673 | |
| | The twelfth surface | ∞ | 1.397 | | | |

TABLE 4 the aspherical coefficients of the second embodiment.

| Optical surface | The first surface | The second surface | The third surface | The fourth surface | The fifth surface |
|---|---|---|---|---|---|
| k | −11.18096 | −0.57027 | 0.059039 | 181.4948 | 3.60068 |
| A | −0.10903 | −0.10931 | −0.25712 | −0.36675 | −0.26653 |
| B | 0.047254 | 0.40567 | −0.16236 | 0.37853 | −0.093110 |
| C | 0.001885 | −1.91388 | 0.82698 | 3.35443 | 1.67601 |
| D | −0.008984 | 5.61083 | 0.037138 | −6.97246 | −5.41995 |
| E | 0.003052 | −5.71716 | −1.09807 | 7.80983 | 8.35282 |
| F | 0 | 0 | 1.93112 | 0 | −10.44659 |
| G | 0 | 0 | −20.73689 | 0 | −1.49043 |
| H | 0 | 0 | 0 | 0 | 0 |
| J | 0 | 0 | 0 | 0 | 0 |

| Optical surface | The sixth surface | The seventh surface | The eighth surface | The ninth surface | The tenth surface |
|---|---|---|---|---|---|
| k | −16.69323 | 0.86837 | −0.77535 | −0.34417 | −18.24851 |
| A | −0.42739 | −0.23027 | 0.40144 | 1.09082 | 0.57210 |
| B | 1.12321 | −0.09099 | −1.13651 | −2.03566 | −0.70742 |
| C | −1.67241 | −0.61332 | 2.09753 | 3.58190 | 0.89528 |
| D | −3.4918 | −0.002432 | −1.75539 | −0.84894 | −0.49251 |
| E | 29.12395 | −1.15220 | 0.17655 | −0.61358 | −0.25922 |
| F | 0 | 0 | 0 | 0 | 0.043278 |
| G | 0 | 0 | 0 | 0 | 0.20128 |
| H | 0 | 0 | 0 | 0 | 0 |
| J | 0 | 0 | 0 | 0 | 0 |

Figure 3B:
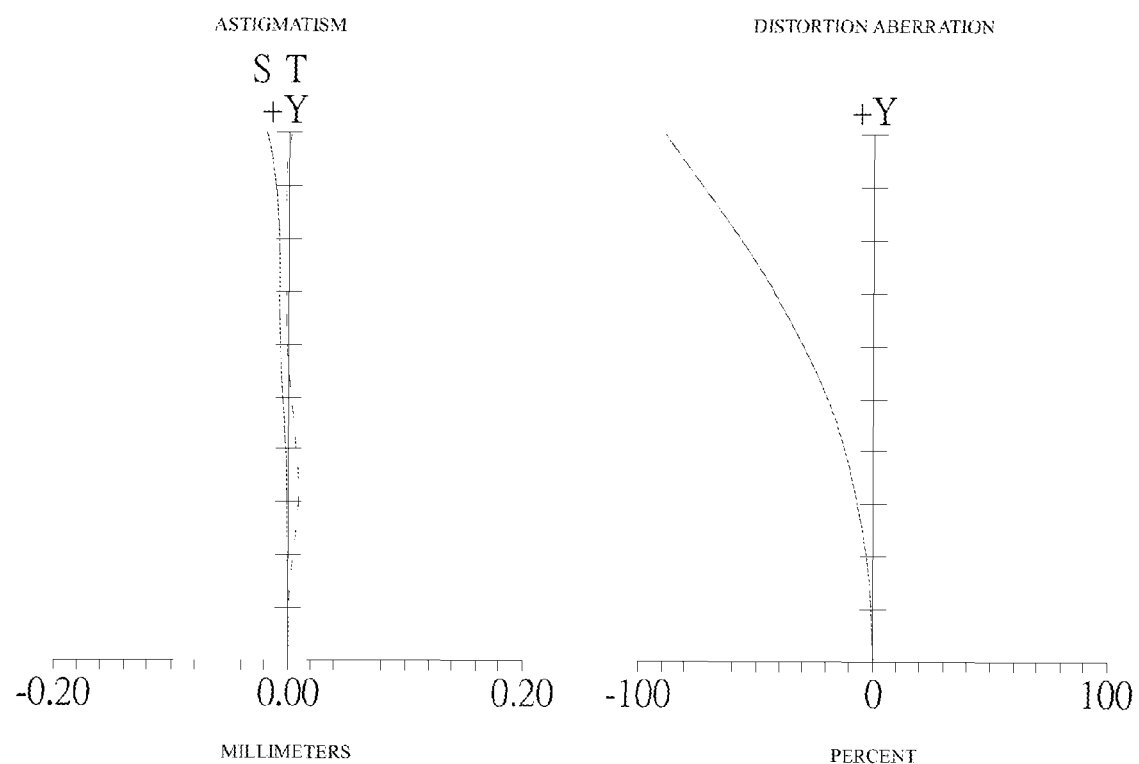
FIG. 3B is a curve of the astigmatism and the distortion aberration according to the second embodiment of the present invention.
Figure 3C:
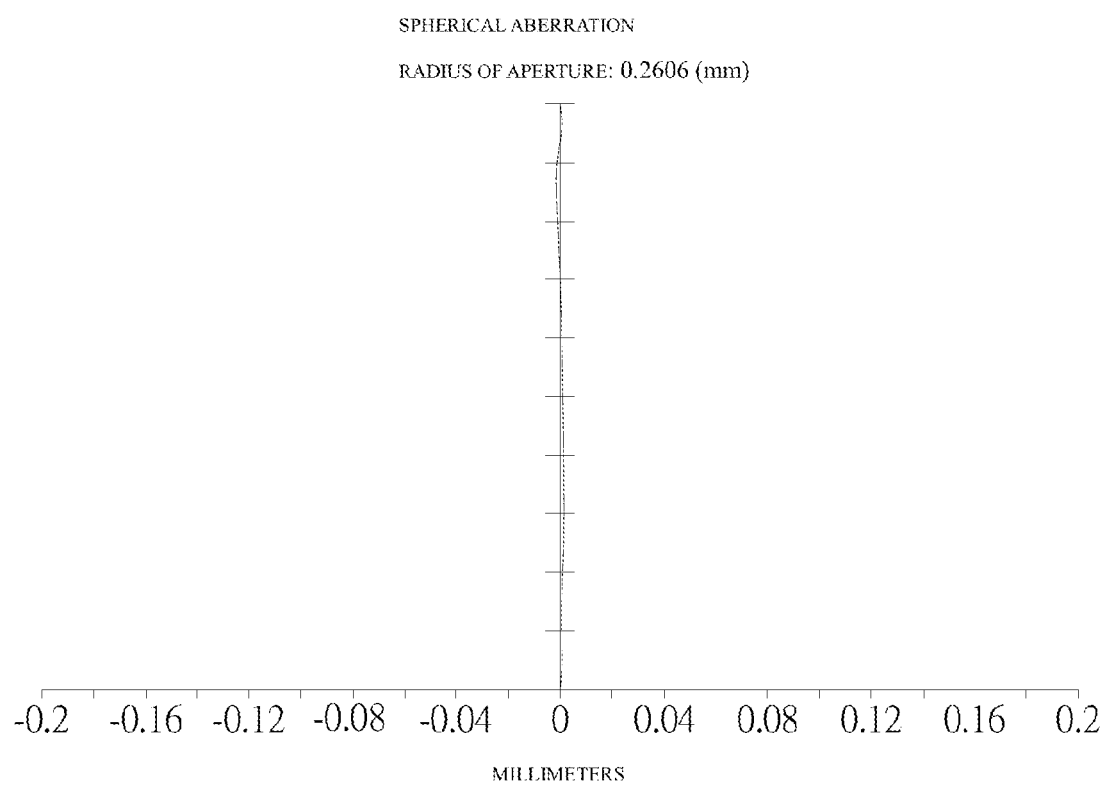
FIG. 3C is a curve of the spherical aberration according to the second embodiment of the present invention.

As known from the basic data of the lens elements of Table 3 and the aberration curves of FIGS. 3B and 3C, there is a good effect of compensation to astigmatism, distortion aberration and spherical aberration through the present embodiment of the five-piece lens set for capturing images of the present invention.

Figure 4A:
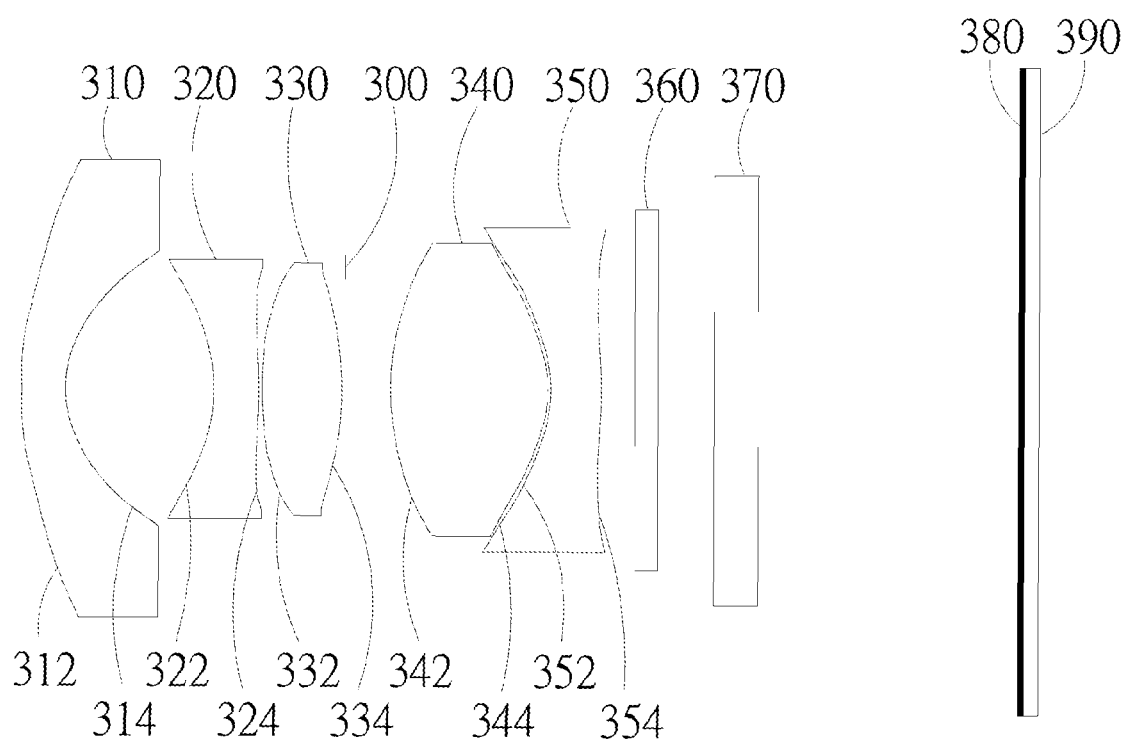
FIG. 4A is a schematic view of the five-piece lens set for capturing images according to the third embodiment of the present invention.

Please refer to FIG. 4A, which is is a schematic view of the five-piece lens set for capturing images of the third embodiment of the present invention. As shown in FIG. 4A, the present invention includes an optical image capturing lens sequentially from an object side surface to an image side surface along an optical axis including a first lens element 310, a second lens element 320, a third lens element 330, a fourth lens element 340, and a fifth lens element 350. Being different from the first embodiment and the second embodiment, the present embodiment also adds a protection lens 370 between the infrared filter 360 and the image plane 380. Wherein the object side surface and the image side surface of the first lens element 310 to the fifth lens element 350 are constituted by using the equation of the aspherical surface of the formula (1) respectively. The aspherical coefficients thereof are shown in Table 6 and the reference wavelength thereof is d-line 587 nm.

In the third embodiment, the length of air interval of maximum horizontal displacement of optical effective diameter position from the image side surface 344 of the fourth lens element 340 to the object side surface 352 of the fifth lens element 350 T45 is 0.03 mm. The distance of horizontal displacement perpendicularly projected on the optical axis from an axial point on the optical axis of the image side surface 344 of the fourth lens element 340 to a maximum effective diameter of the image side surface 344 of the fourth lens element 340 Sag4=−0.508 mm. The distance of horizontal displacement perpendicularly projected on the optical axis from an axial point on the optical axis of the object side surface 352 of the fifth lens element 350 to a maximum effective diameter of the object side surface 352 of the fifth lens element 350 Sag5=−0.520 mm. Wherein |Sag4|/|Sag5|=0.98 satisfies 0.8<|Sag4|/|Sag5|<1.4.

The vertical distance on the image side surface 354 of the fifth lens element 350 between an inflection point and the optical axis HI=0.427 mm. The distance of horizontal displacement perpendicularly projected on the optical axis from an axial point on the optical axis of the image side surface 354 of the fifth lens element 350 to a maximum effective diameter of the image side surface 354 of the fifth lens element 350 DR is 0.035 mm. Also, 0 mm≤HI≤1 mm and 0 mm≤DR≤0.5 mm are satisfied. The distance from the fixed aperture stop 300 to the image plane 380 AT is 6.077 mm. The distance from the object side surface 312 of the first lens element 310 to the image plane 380 OT is 9 mm. AT/OT=0.675 satisfies 0.5≤AT/OT≤0.8. The maximum field of view in use of the five-piece lens set for capturing images FOV is 120° and 90°<FOV<180° is satisfied. An Abbe number of the first lens element 310 in spectrum 587.6 nm Vd1 is 56.07. An Abbe number of the second lens element 320 in spectrum 587.6 nm Vd2 is 56.07. An Abbe number of the third lens element 330 in spectrum 587.6 nm Vd3 is 56.07. An Abbe number of the fourth lens element 340 in spectrum 587.6 nm Vd4 is 56.07. An Abbe number of the fifth lens element 350 in spectrum 587.6 nm Vd5 is 23.416. Also, Vd1+Vd2+Vd3+Vd4>6Vd5 is satisfied.

The sum of thicknesses of all lens elements with refractive power on the optical axis ΣCT is 3.402 mm. The distance on the optical axis from the object side surface 312 of the first lens element 310 to the image side surface 354 of the fifth lens element 350 TT is 5.237 mm, wherein ΣCT/TT=0.650 satisfies 0.5≤TT/OT≤0.7. The focal length of the optical lens set f=2.487 mm. The distance on the optical axis from the image side surface 314 of the first lens element 310 to the object side surface 322 of the second lens element 320 T12 is 1.334 mm, wherein T12/f=0.536 and TT/OT=0.582, 0.3≤T12/f≤0.7 and 0.5≤TT/OT≤0.7 are satisfied. Also, (CT2+T12)/CT1=4.359, DR/CT5=0.037 and DR/HI=0.040, 2.0 (CT2+T 12)/CT1≤6.0, 0<DR/CT5<0.3 and 0≤DR/HI≤0.3 are satisfied respectively.

TABLE 5 the basic data of the lens elements of the third embodiment.

| Surface | | Radius of curvature | Thickness/ Interval | Refractive index (Nd) | Abbe number (Vd) | Focal length (EFL) |
|---|---|---|---|---|---|---|
| The first lens element | The first surface | 2.878 | 0.4 | 1.5346 | 56.07 | −3.141 |
| | The second surface | 1.011 | 1.334 | | | |
| The second lens element | The third surface | −1.576 | 0.409 | 1.5346 | 56.07 | −4.014 |
| | The fourth surface | −6.421 | 0.03 | | | |
| The third lens element | The fifth surface | 3.187 | 0.719 | 1.5346 | 56.07 | 3.041 |
| | The sixth surface | −3.078 | 0.03 | | | |
| Fixed aperture stop | | ∞ | 0.411 | | | |
| The fourth lens element | The seventh surface | 2.352 | 1.417 | 1.5346 | 56.07 | 1.759 |
| | The eighth surface | −1.244 | 0.03 | | | |
| The fifth lens element | The ninth surface | −1.181 | 0.457 | 1.631919 | 23.4161 | −2.695 |
| | The tenth surface | −4.359 | 0.307 | | | |
| Infrared filter | The eleventh surface | ∞ | 0.21 | 1.5168 | 64.1673 | |
| | The twelfth surface | ∞ | 0.5 | | | |
| Protection lens | The thirteenth surface | ∞ | 0.4 | 1.5168 | 64.1673 | |
| | The fourteenth surface | ∞ | 2.346 | | | |

TABLE 6 the aspherical coefficients of the third embodiment.

| Optical surface | The first surface | The second surface | The third surface | The fourth surface | The fifth surface |
|---|---|---|---|---|---|
| k | −1.56385 | −0.44905 | −0.16316 | 21.84515 | 5.11657 |
| A | −0.02452 | −0.03915 | −0.00534 | 0.04210 | 0.00852 |
| B | 0.00513 | −0.02510 | 0.05705 | 0.06809 | −0.00878 |
| C | −0.00021 | −0.00110 | −0.01506 | −0.01093 | 0.01000 |
| D | −0.0011 | −0.00505 | −0.00162 | −0.00520 | −0.01490 |
| E | 1.8937E−5 | −0.00664 | 0.00118 | 0.00780 | 0.00905 |
| F | 0 | 0 | 0 | −0.00090 | 0 |
| G | 0 | 0 | 0 | −0.00247 | 0 |
| H | 0 | 0 | 0 | 0 | 0 |
| J | 0 | 0 | 0 | 0 | 0 |

| Optical surface | The sixth surface | The seventh surface | The eighth surface | The ninth surface | The tenth surface |
|---|---|---|---|---|---|
| k | −20.93543 | 0.62778 | −0.74916 | −0.45977 | −15.84502 |
| A | −0.08842 | −0.02648 | 0.12155 | 0.23484 | 0.10303 |
| B | 0.05518 | 0.01049 | −0.03722 | −0.09829 | −0.04040 |
| C | −0.01666 | −0.00771 | −0.00428 | 0.01355 | 0.00889 |
| D | −0.00728 | 0.00405 | 0.00790 | 0.00541 | −0.00112 |
| E | 0.01127 | −0.00085 | −0.00043 | 0.00030 | −1.5334E−5 |
| F | −0.00255 | 0 | 0 | 0 | 0.00014 |
| G | 0.00334 | 0 | 0 | 0 | −3.8538E−5 |
| H | 0 | 0 | 0 | 0 | 0 |
| J | 0 | 0 | 0 | 0 | 0 |

Figure 4B:
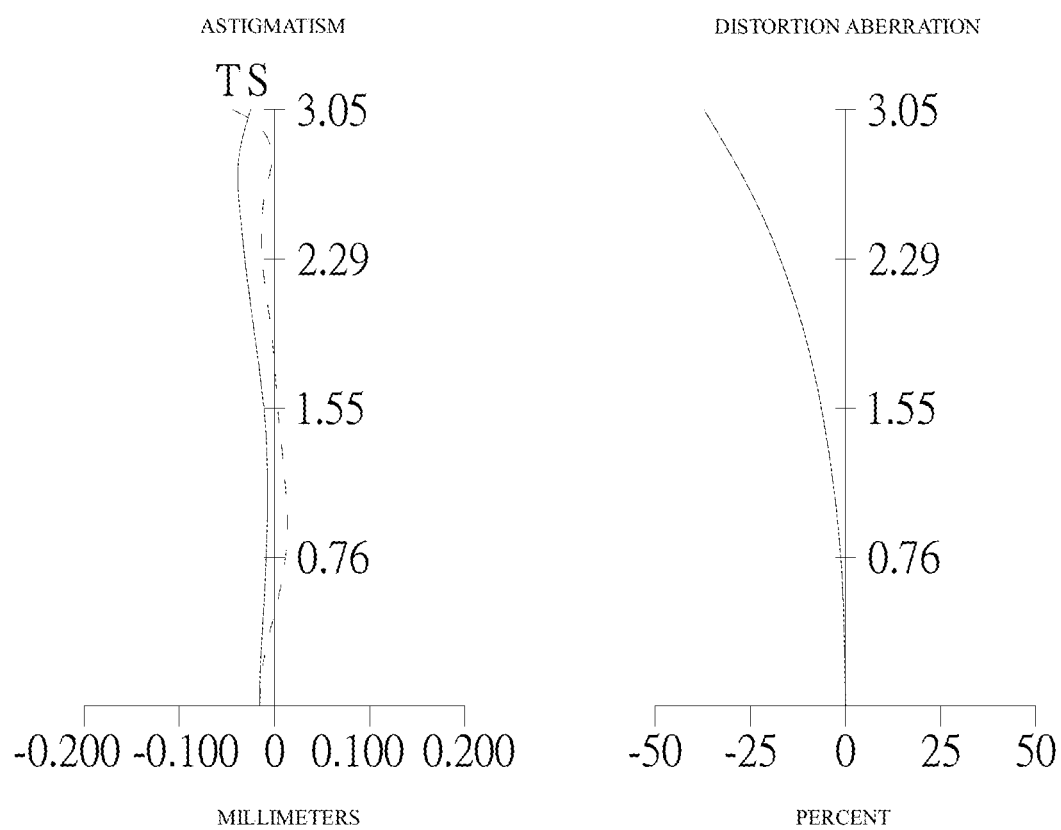
FIG. 4B is a curve of the astigmatism and the distortion aberration according to the third embodiment of the present invention.
Figure 4C:
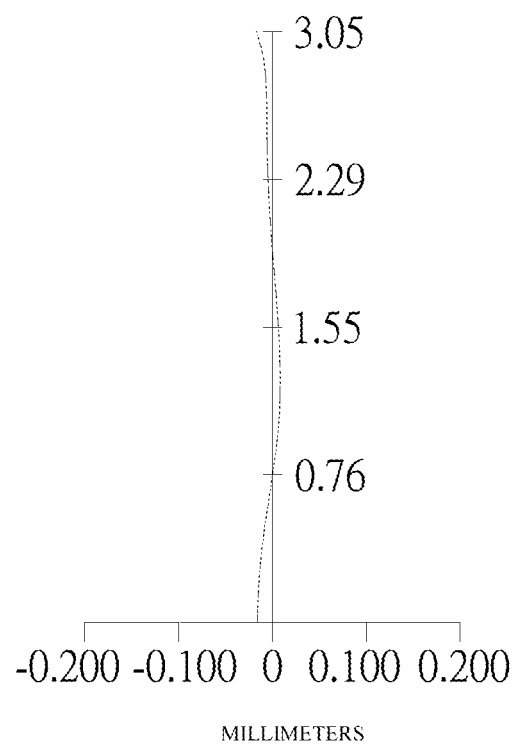
FIG. 4C is a curve of the spherical aberration according to the third embodiment of the present invention.

As known from the basic data of the lens elements of Table 5 and the aberration curves of FIGS. 4B and 4C, there is a good effect of compensation to astigmatism, distortion aberration and spherical aberration through the present embodiment of the five-piece lens set for capturing images of the present invention.

Although the present invention has been particularly shown and described with reference to the exemplary embodiments thereof, it will be understood by those ordinary skills in the relevant technical field that, various changes may be made to the present invention in form and in details without departing from the spirit and the scope of the present invention defined by the claims and its equivalents below.

What is claimed is:

1. A five-piece lens set for capturing images, comprising:
a fixed aperture stop;
an optical lens set, sequentially from an object side surface to an image side surface along an optical axis comprising
  a first lens element, the first lens element having negative refractive power adjacent to the optical axis and an image side surface of the first lens element being a concave surface;
  a second lens element, the second lens element having negative refractive power adjacent to the optical axis;
  a third lens element, the third lens element having positive refractive power adjacent to the optical axis, an object side surface of the third lens element being a convex surface and an image side surface of the third lens element being a convex surface;
  a fourth lens element, the fourth lens element having positive refractive power adjacent to the optical axis and an object side surface of the fourth lens element being a convex surface;
  a fifth lens element, the fifth lens element having negative refractive power adjacent to the optical axis and an image side surface of the fifth lens element being a convex surface, wherein the image side surface of the fifth lens element is an aspherical surface;
wherein there is a length of air interval between an image side surface of the fourth lens element and an object side surface of the fifth lens element, the image side surface of the fifth lens element has at least one inflection point, and a vertical distance on the image side surface of the fifth lens element between an inflection point nearest to the optical axis and the optical axis is HI, and the following relation is satisfied: 0 mm≤HI≤1 mm.

2. The five-piece lens set for capturing images of claim 1, wherein the length of air interval of maximum horizontal displacement of optical effective diameter position from the image side surface of the fourth lens element to the object side surface of the fifth lens element is T45, and the following relation is satisfied: T45>0.01 mm.

3. The five-piece lens set for capturing images of claim 1, wherein a distance of horizontal displacement perpendicularly projected on the optical axis from an axial point on the optical axis of the image side surface of the fourth lens element to a maximum effective diameter of the image side surface of the fourth lens element is Sag4, a distance of horizontal displacement perpendicularly projected on the optical axis from an axial point on the optical axis of the object side surface of the fifth lens element to a maximum effective diameter of the object side surface of the fifth lens element is Sag5, and the following relation is satisfied: $0.8<|Sag4|/|Sag5|<1.4$.

4. The five-piece lens set for capturing images of claim 1, wherein a distance of horizontal displacement perpendicularly projected on the optical axis from an axial point on the optical axis of the image side surface of the fifth lens element to a maximum effective diameter of the image side surface of the fifth lens element is DR, and the following relation is satisfied: $0\ mm \leq DR \leq 0.5\ mm$.

5. The five-piece lens set for capturing images of claim 4, wherein a thickness of the fifth lens element on the optical axis is CT5, and the following relation is satisfied: $0<DR/CT5<0.3$.

6. The five-piece lens set for capturing images of claim 1, further comprising an aperture stop and an image plane, wherein a distance on the optical axis from the aperture stop to the image plane is AT and a distance on the optical axis from the object side surface of the first lens element to the image plane is OT, and the following relation is satisfied: $0.5 \leq AT/OT \leq 0.8$.

7. The five-piece lens set for capturing images of claim 1, wherein a maximum field of view in use of the five-piece lens set for capturing images is FOV, and the following relation is satisfied: $FOV>90°$.

8. The five-piece lens set for capturing images of claim 1, wherein an Abbe number of the first lens element in spectrum 587.6 nm is Vd1, an Abbe number of the second lens element in spectrum 587.6 nm is Vd2, an Abbe number of the third lens element in spectrum 587.6 nm is Vd3, an Abbe number of the forth lens element in spectrum 587.6 nm is Vd4, an Abbe number of the fifth lens element in spectrum 587.6 nm is Vd5, and the following relation is satisfied: $Vd1+Vd2+Vd3+Vd4>6Vd5$.

9. The five-piece lens set for capturing images of claim 1, wherein a sum of thicknesses of all lens elements with refractive power on the optical axis is $\Sigma CT$ and a distance on the optical axis from the object side surface of the first lens element to the image side surface of the fifth lens element is TT, and the following relation is satisfied: $0.5 \leq \Sigma CT/TT \leq 0.85$.

10. The five-piece lens set for capturing images of claim 1, wherein a focal length of the optical lens set is f and a distance on the optical axis from the image side surface of the first lens element to the object side surface of the second lens element is T12, and the following relation is satisfied: $0.3 \leq T12/f \leq 0.7$.

11. The five-piece lens set for capturing images of claim 1, further comprising an image plane, wherein a distance on the optical axis from the object side surface of the first lens element to the image side surface of the fifth lens element is TT and a distance on the optical axis from the object side surface of the first lens element to the image plane is OT, and the following relation is satisfied: $0.5 \leq TT/OT \leq 0.7$.

12. The five-piece lens set for capturing images of claim 1, wherein a distance on the Optical axis from the image side surface of the first lens element to the object side surface of the second lens element is T12, the thicknesses of the first lens element and the second lens element are CT1 and CT2 respectively, and the following relation is satisfied: $2.0 \leq (CT2+T12)/CT1 \leq 6.0$.

13. The five-piece lens set for capturing images of claim 1, wherein a maximum field of view in use of the five-piece lens set for capturing images is FOV, and the following relation is satisfied: $90°<FOV<180°$.

14. The five-piece lens set for capturing images of claim 1, wherein a distance of horizontal displacement perpendicularly projected on the optical axis from an axial point on the optical axis of the image side surface of the fifth lens element to a maximum effective diameter of the image side surface of the fifth lens element is DR, and the following relation is satisfied: $0 \leq DR/HI \leq 0.3$.

15. The five-piece lens set for capturing images of claim 1, wherein the five pieces of the imaging lens group, wherein the object side surface of the second lens element near the optical axis is a concave surface.

* * * * *